(12) United States Patent
Kasuga et al.

(10) Patent No.: US 10,298,801 B2
(45) Date of Patent: May 21, 2019

(54) IMAGE FORMING SYSTEM HAVING AN ELECTRICITY ELIMINATOR

(71) Applicant: KONICA MINOLTA, INC., Chiyoda-ku, Tokyo (JP)

(72) Inventors: Akio Kasuga, Hachioji (JP); Kenji Kawatsu, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/706,024

(22) Filed: Sep. 15, 2017

(65) Prior Publication Data

US 2018/0084135 A1    Mar. 22, 2018

(30) Foreign Application Priority Data

Sep. 16, 2016    (JP) .................. 2016-181150

(51) Int. Cl.
| | | |
|---|---|---|
| G03G 15/01 | (2006.01) | |
| H04N 1/00 | (2006.01) | |
| B08B 3/10 | (2006.01) | |
| G03G 15/02 | (2006.01) | |
| G03G 15/22 | (2006.01) | |

(Continued)

(52) U.S. Cl.
CPC .......... *H04N 1/00976* (2013.01); *B08B 3/10* (2013.01); *G03G 15/0105* (2013.01); *G03G 15/0266* (2013.01); *G03G 15/22* (2013.01); *G03G 21/203* (2013.01); *H04N 1/00591* (2013.01); *H04N 1/0464* (2013.01); *H04N 1/00639* (2013.01); *H04N 1/6027* (2013.01); *H04N 2201/0094* (2013.01)

(58) Field of Classification Search
CPC .. B08B 3/10; G03G 15/0105; G03G 15/0266; G03G 15/22; G03G 21/203; H04N 1/00591; H04N 1/00976; H04N 1/0464; H04N 1/00639; H04N 1/6027; H04N 2201/0094
See application file for complete search history.

(56) References Cited

U.S. PATENT DOCUMENTS

2009/0317160 A1*  12/2009  Kougami .......... G03G 15/6576
                                                  399/406

FOREIGN PATENT DOCUMENTS

| JP | 3478815 B2 | 12/2003 |
|---|---|---|
| JP | 3528047 B2 | 5/2004 |

(Continued)

OTHER PUBLICATIONS

JPO Rejection Notice corresponding to Application No. 2016-181150; dated Mar. 12, 2019.

*Primary Examiner* — Hoang X Ngo
(74) *Attorney, Agent, or Firm* — Cantor Colburn LLP

(57) ABSTRACT

An image forming system includes an image forming apparatus which forms an image on a sheet, an image reading apparatus which reads the image formed on the sheet by the image forming apparatus, and a finisher which performs a post-printing process with the sheet. The image forming system further includes: a paper path which is provided in the image reading apparatus and through which the sheet is passed; and an electricity eliminator which is arranged in the upstream side of the finisher to eliminate static electricity of the sheet, wherein the electricity eliminator applies at least one of water and charge to front and back sides of the sheet.

5 Claims, 12 Drawing Sheets

(51) Int. Cl.
*G03G 21/20* (2006.01)
*H04N 1/04* (2006.01)
*H04N 1/60* (2006.01)

(56) References Cited

FOREIGN PATENT DOCUMENTS

| | | | |
|---|---|---|---|
| JP | 3584145 | B2 | 11/2004 |
| JP | 2010001089 | A | 1/2010 |
| JP | 5279441 | B2 | 9/2013 |
| JP | 5482820 | B2 | 5/2014 |
| JP | 2016122155 | A | 7/2016 |
| JP | 2016141553 | A | 8/2016 |
| JP | 2016166916 | A | 9/2016 |

* cited by examiner sheet passing direction tendency to be minus ↓   ↑ tendency to be plus (+)
asbestos
human hair/fur
glass
mica
nylon
silk
rayon
cotton
hemp
wood
(human body)
paper
ebonite
gold/cupper/iron/aluminium
rubber
polyester
acryl (fiber)
vinyl chloride
teflon
(−)

IMAGE FORMING SYSTEM HAVING AN ELECTRICITY ELIMINATOR

CROSS REFERENCE TO RELATED APPLICATIONS

The present invention claims priority under 35 U.S.C. § 119 to Japanese Patent Application No. 2016-181150 filed on Sep. 16, 2016, the entire content of which are incorporated herein by reference.

BACKGROUND

Technological Field

The present invention relates generally to an image forming system.

Description of the Related Art

Conventionally, after forming an image on a sheet by an image forming apparatus, the sheet may be processed by a finisher to perform post-printing processes. However, since sheets conveyed to a finisher may sometimes be stuck to each other due to static electricity, the quality of post-printing processes may be degraded.

When conveying a sheet, the static electricity of the sheet is generated by peeling charge when the sheet is peeled off from a roller nip, friction charge due to microslippage of the sheet at the roller nip, charge transfer from the sheet to a guide member, or the like. Such peeling charge, friction charge, charge transfer or the like is easily influenced by a temperature and a humidity environment on sheet conveying routes, the paper quality of a sheet, the toner amount attached to a sheet, the charged quantity of a guide member or the like. Also, the greater the potential difference between the front and back sides of a charged sheet increases, the greater the attractive force exerted between sheets increases. Accordingly, if a post-printing process is performed with sheets stuck together by the attractive force exerted therebetween, the quality of the post-printing process may be degraded. For example, when performing a sheet aligning process for aligning leading or tailing edges of sheets, or when a side edges aligning process for aligning sheets during stacking discharged sheets, if there is generated an inter-paper attractive force which hinders sheets from being aligned due to static electricity, a paper jam or paper damage may occur. It is thereby desirable to eliminate the static electricity of a sheet for preventing the quality of a post-printing process from being degraded.

Because of this, in various conventional techniques, it has been proposed to form a discharging circuit for eliminating static electricity when a sheet comes in contact with a discharging member to conduct static electricity to ground so that the static electricity is eliminated from the sheet (for example, refer to Japanese Granted Patent Publication No. 3478815, Japanese Patent Granted Publication No. 3584145, and Japanese Patent Granted Publication No. 3528047).

Meanwhile, in various conventional techniques, it has been proposed to feed back the reading result of an image formed on a sheet and correct color tones of the image and the like (for example, refer to Japanese Granted Patent Publication No. 5482820 and Japanese Granted Patent Publication No. 5279441).

For example, an image reading apparatus may be provided between an image forming apparatus and a finisher for the purpose of feeding back the reading result of an image formed on a sheet and correcting color tones of the image and the like. In such an arrangement, a paper path through the image reading apparatus is narrower than that in the arrangement in which no image reading apparatus is provided. A sheet is thereby likely to come in contact with the paper path in the image reading apparatus. Accordingly, further static electricity can be generated due to the friction between a sheet and the paper path in the image reading apparatus. In the case where an image reading apparatus is provided between an image forming apparatus and a finisher, thereby, it is impossible to sufficiently eliminate static electricity by the prior art techniques such as described in Japanese Patent Publication No. 3478815, Japanese Granted Patent Publication No. 3584145, Japanese Granted Patent Publication No. 3528047, Japanese Granted Patent Publication No. 5482820 and Japanese Granted Patent Publication No. 5279441.

SUMMARY

Namely, the prior art techniques such as described in the above Patent Publications cannot be used to prevent degradation of the quality of a post-printing process due to static electricity of a sheet which is conveyed from an image reading apparatus to a finisher.

Taking into consideration the above circumstances, it is an object of the present invention therefore to provide an image forming system which can prevent degradation of the quality of a post-printing process due to static electricity of a sheet conveyed from an image reading apparatus to a finisher.

To achieve at least one of the abovementioned objects, according to an aspect of the present invention, an image forming system reflecting one aspect of the present invention includes an image forming apparatus which forms an image on a sheet, an image reading apparatus which reads the image formed on the sheet by the image forming apparatus, and a finisher which performs a post-printing process with the sheet, and comprises: a paper path which is provided in the image reading apparatus and through which the sheet is passed; and an electricity eliminator which is arranged in the upstream side of the finisher to eliminate static electricity of the sheet, wherein the electricity eliminator applies at least one of water and charge to front and back sides of the sheet.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In what follows, an embodiment of the present invention will be explained with reference to drawings. However, the present invention is not limited to the following specific embodiments.

Embodiment 1.

Figure 1:
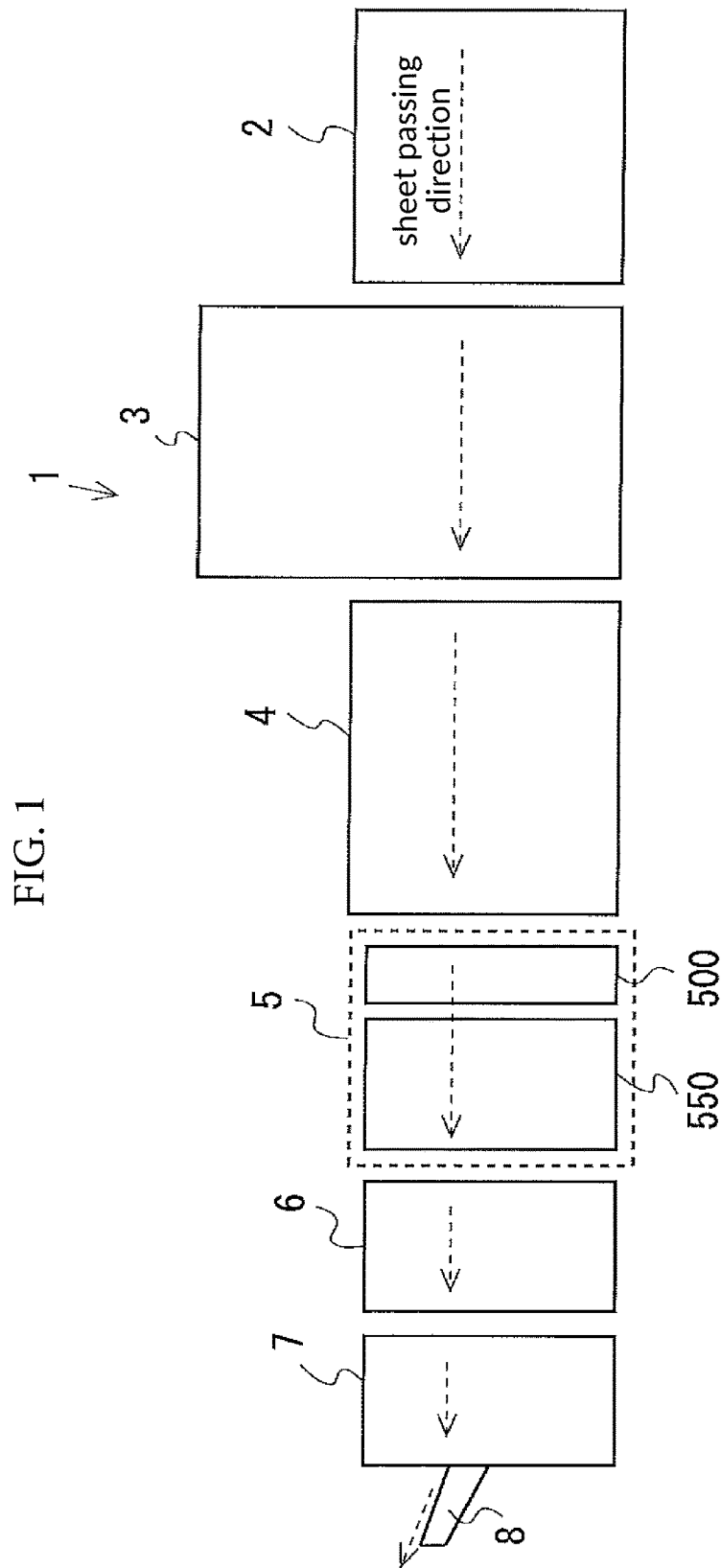
FIG. 1 is a schematic view for showing an example of the overall configuration of an image forming system 1 in accordance with an embodiment 1 of the present invention.

FIG. 1 is a schematic view for showing an example of the overall configuration of an image forming system 1 in accordance with an embodiment 1 of the present invention. As shown in FIG. 1, the image forming system 1 includes a paper feed apparatus 2, an image forming apparatus 3, an image reading apparatus 4, an electricity eliminator 5, a finisher 6, and a sheet discharger 7. The paper feed apparatus 2 supplies a paper medium P to the image forming apparatus 3. The image forming apparatus 3 forms an image on the paper medium P which is supplied from the paper feed apparatus 2. The image forming apparatus 3 outputs, as an output sheet P', the paper medium P on which the image is formed. The image reading apparatus 4 reads the output sheet P' and performs various processes.

The electricity eliminator 5 is located in the upstream side of the finisher 6 to eliminate electricity of the output sheet P'. The electricity eliminator 5 applies at least one of water and charge to the front and back sides of the output sheet P'. The electricity eliminator 5 is provided with a humidifier 550 and a charge applicator 500. The humidifier 550 can be freely arranged between the image forming apparatus 3 and the finisher 6, and serves to apply water to the front and back sides of the output sheet P'. The charge applicator 500 can be freely arranged between the image forming apparatus 3 and the finisher 6, and serves to apply charge to the front and back sides of the output sheet P'. The charge applicator 500 is located in the upstream side of the humidifier 550.

The finisher 6 performs post-printing processes such as punching. The sheet discharger 7 is provided with a catch tray 8 to which is discharged a paper medium P which is conveyed from the finisher 6.

Figure 2:
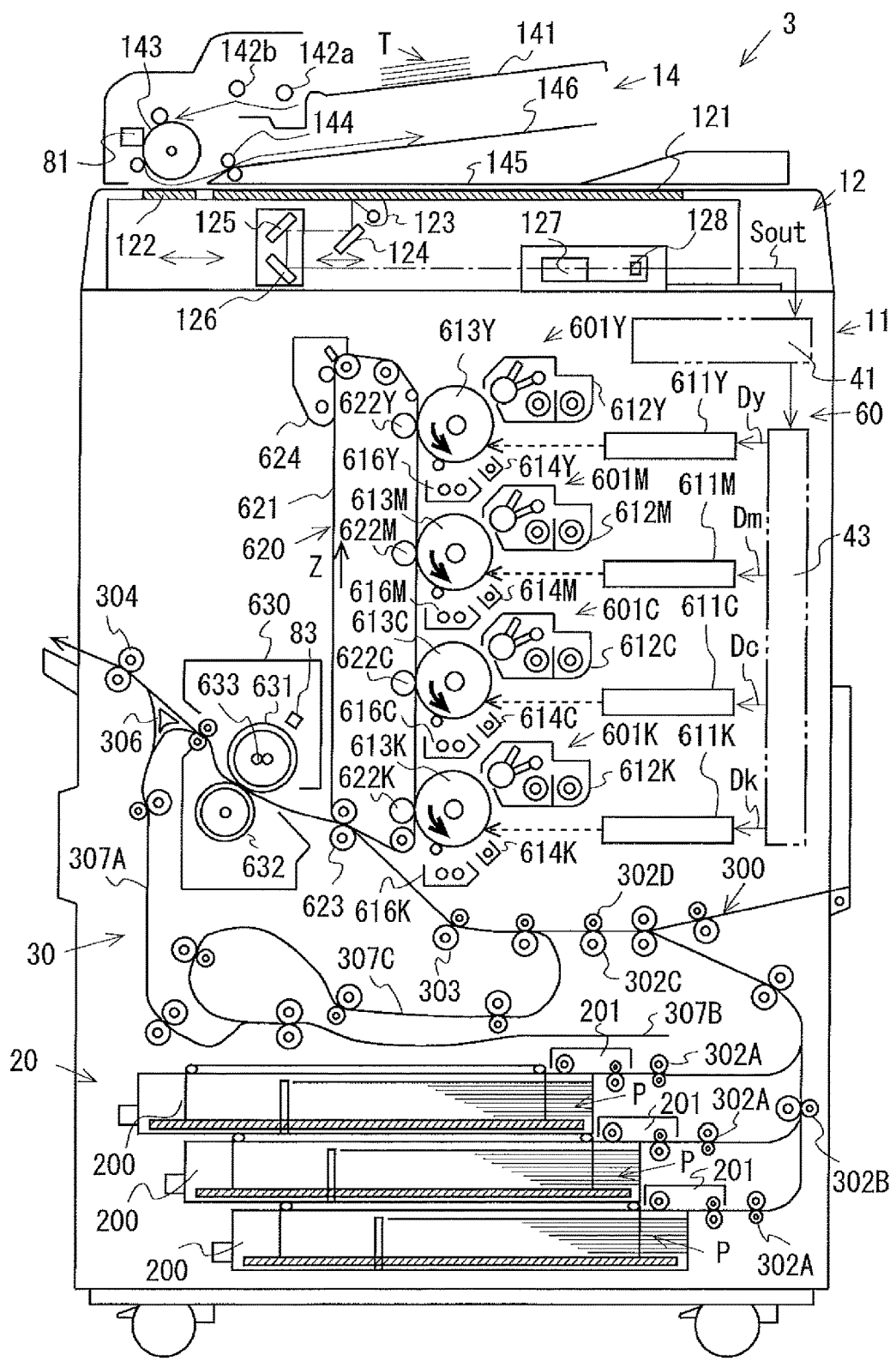
FIG. 2 is a view for showing an exemplary structure of an image forming apparatus 3 in accordance with the embodiment 1 of the present invention.

FIG. 2 is a view for showing an exemplary structure of the image forming apparatus 3 in accordance with the embodiment 1 of the present invention. As shown in FIG. 2, the image forming apparatus 3 is a type of a color copying machine. The image forming apparatus 3 acquires image information by reading images formed on an original T. The image forming apparatus 3 superimposes respective colors based on the acquired image information to form a full color image. Besides such a color copying machine, the image forming apparatus 3 can be applied to a color printer, a facsimile machine or a multi-functional peripheral thereof.

The image forming apparatus 3 is provided with an image forming apparatus body 11. A color image reading unit 12 and an automatic document feeder 14 are installed on the top of the image forming apparatus body 11. As described in detail below, the image forming apparatus body 11 includes a control unit 41, an image processing unit 43, an image forming unit 60, a paper feed unit 20 and a conveyance unit 30.

The automatic document feeder 14 is located on the image reading unit 12 The automatic document feeder 14 performs an operation of automatically feeding one or more original T in an automatic feeding mode. The automatic feeding mode is a mode for feeding an original T placed on the automatic document feeder 14, and reading an image printed on the original T.

More specifically, the automatic document feeder 14 is provided with an original placing member 141, a roller 142a, a roller 142b, a roller 143, a roller 144, a sheet reversing member 145 and a discharge tray 146. One or more original T is placed on the original placing member 141. The roller 142a and the roller 142b are located in the downstream side of the original placing member 141. The roller 143 is located in the downstream side of the roller 142a and the roller 142b. A positioning sensor 81 is provided on the outer circumference of the roller 143.

When the automatic feeding mode is selected, an original T fed from the original placing member 141 is conveyed by the roller 143 to form a U-shaped turn. Preferably, when the automatic feeding mode is selected, an original T is placed on the original placing member 141 with its printed side facing up.

After reading by the image reading unit 12, the original T is conveyed by the roller 144 and discharged onto the discharge tray 146. Meanwhile, the automatic document feeder 14 can convey the original T through the sheet reversing member 145 to read not only the printed side of the original T but also the opposite side to the printed side of the original T with the image reading unit 12.

The positioning sensor 81 detects an original T. The positioning sensor 81 consists for example of a reflection type photosensor. The positioning sensor 81 pulls up an output signal when an original T is detected, and pulls down the output signal when the original T becomes no longer detected. The output signal is transmitted to the control unit 41. Namely, while the original T is passing through the positioning sensor 81, the output signal is maintained at a certain level.

The image reading unit 12 reads a color image formed on an original T. The image reading unit 12 is provided with a one-dimensional image sensor 128. In addition to the image sensor 128, the image reading unit 12 is further provided with a first platen glass 121, a second platen glass 122, a light source 123, mirrors 124 through 126, an image forming optical unit 127 and an optical drive unit which is not shown in the figure.

The light source 123 irradiates an original T with light. The optical drive unit not shown in the figure moves the original T or the image sensor 128 in relation to each other in the subscanning direction. Incidentally, the main scanning direction is the direction in which are arranged a plurality of light receiving devices forming the image sensor 128. On the other hand, the subscanning direction is the direction perpendicular to the main scanning direction.

An original T is conveyed by the automatic document feeder 14 and passed through an optical system of the image reading unit 12 to read an image(s) on either or both sides of the original T. Images of either or both sides of the original T are read by the image sensor 128. In a platen mode, the image sensor 128 outputs an image reading signal Sout which is obtained by reading an original T based on the RGB color model. This platen mode is a mode in which the optical drive unit not shown in the figure is driven to automatically read an image printed on an original T which is placed on a first platen glass 121.

The image sensor 128 includes three line color CCD imaging devices. Namely, the image sensor 128 consists of a plurality of light receiving element rows arranged in the main scanning direction. Specifically, read sensors which detect light corresponding to red (R), a green (G) and blue (B) divide picture elements in different positions in the subscanning direction perpendicular to the main scanning direction to read optical information corresponding to red, green and blue at the same time respectively. For example, when an original T is reversed by the roller 143 as a U-shaped turn in the automatic feeding mode, the image sensor 128 reads the surface of the original T and outputs an image reading signal S out. The image reading signal Sout is an analog signal which is obtained by photoelectrically conversion with the image sensor 128.

In other words, the image sensor 128 photoelectrically converts light which is radiated to and reflected from an image formed on a sheet. The image sensor 128 is connected to the image processing unit 43 through the control unit 41. The image reading signal Sout is output to the image processing unit 43 through the control unit 41. The image reading signal Sout is used to perform various processes with the image processing unit 43.

The image processing unit 43 is provided with an arithmetic unit such as a CPU or an integrated circuit such as an ASIC. The image processing unit 43 serves as a processor for performing various processes. For example, the image processing unit 43 performs, with the image reading signal Sout, an analog process, an A/D conversion process, a shading compensation process, an image compression process, a variable magnification process and so forth.

The image processing unit 43 converts the analog image reading signal Sout with reference to a three-dimensional color information conversion table from digital image data (R, G and B) including a color R component, a color G component and a color B component to image data Dy, Dm, Dc and Dk corresponding to color Y (yellow), color M (Magenta), color C (cyan) and color K (black) respectively. The image processing unit 43 transfers the image data (Dy, Dm, Dc and Dk) to LED writing units 611Y, 611M, 611C and 611K incorporated in the image forming unit 60.

The image forming apparatus 60 makes use of an electrophotographic process technique. The image forming unit 60 forms intermediate transfer type color images. This image forming unit 60 is based on a vertical tandem system. The image forming unit 60 is provided with image forming units 601Y, 601M, 601C and 601K corresponding to the color components respectively, the intermediate transfer unit 620, and a fixing unit 630 to form a color image based on the image data (Dy, Dm, Dc and Dk) transferred from the image processing unit 43.

The image forming unit 601Y forms an image of color Y (yellow). The image forming unit 601Y is provided with a photoreceptor drum 613Y, a charging unit 614Y, an LED writing unit 611Y, a developing unit 612Y, and a cleaning unit 616Y.

The photoreceptor drum 613Y forms a toner image of color Y. The charging unit 614Y is arranged in the vicinity of the photoreceptor drum 613Y, and uniformly charges the surface of the photoreceptor drum 613Y with negative charge by corona discharge. The LED writing unit 611Y irradiates the photoreceptor drum 613Y with light corresponding to an image of color Y component. The developing unit 612Y forms a toner image by attaching a toner of color Y component to the surface of the photoreceptor drum 613Y to visualize the electrostatic latent image. The cleaning unit 616Y removes transfer residual toner which remains on the surface of the photoreceptor drum 613Y after a first transfer process.

Incidentally, each of the image forming units 601M, 601C and 601K has the similar constituent elements and functions as the image forming unit 601Y except for the color of images to be formed, and therefore redundant description is not repeated. Meanwhile, the image forming units 601Y, 601M, 601C and 601K are collectively referred to simply as the image forming unit 601.

The intermediate transfer unit 620 is provided with an intermediate transfer belt 621, first transfer rollers 622Y, 622M, 622C and 622K, a second transfer roller 623, a belt cleaning apparatus 624 and the like.

The intermediate transfer belt 621 is made of an endless belt. A plurality of support rollers are arranged in the inner peripheral side of the endless belt. The endless belt is wound around the plurality of support rollers in the form of a loop. At least one of the plurality of support rollers consists of a drive roller, and the others consist of non-driven rollers respectively. For example, the support roller located in the downstream side of the first transfer rollers 622K for K component in the belt running direction is preferably implemented as the drive roller in this case. When the drive roller rotates, the intermediate transfer belt 621 runs at a constant speed in the direction indicated with arrow Z.

The first transfer rollers 622Y, 622M, 622C and 622K are arranged in the inner surface side of the intermediate transfer belt 621. The first transfer rollers 622Y, 622M, 622C and 622K are arranged opposed to the photoreceptor drums 613Y, 613M, 613C and 613K respectively. Namely, the first transfer rollers 622Y, 622M, 622C and 622K are urged against the photoreceptor drums 613Y, 613M, 613C and 613K respectively through the intermediate transfer belt 621. By this arrangement, first transfer nip portions are formed between the photoreceptor drums 613Y, 613M, 613C and 613K and the intermediate transfer belt 621. Toner images are transferred from the photoreceptor drums 613Y, 613M, 613C and 613K to the intermediate transfer belt 621.

Incidentally, the first transfer rollers 622Y, 622M, 622C and 622K are collectively referred to simply as the first transfer roller 622 when they need not be distinguished. Still further, the photoreceptor drums 613Y, 613M, 613C and 613K are collectively referred to simply as the photoreceptor drum 613.

The second transfer roller 623 is located in the outer surface side of the intermediate transfer belt 621. The second transfer roller 623 is located opposed to one of the plurality of support rollers. Of the plurality of support rollers, the support roller located opposite to the intermediate transfer belt 621 is called a backup roller. A second transfer nip portion is formed by urging the second transfer roller 623 against the backup roller with the intermediate transfer belt 621 therebetween. At the second transfer nip portion, toner images are transferred from the intermediate transfer belt 621 to the paper medium P.

When the intermediate transfer belt 621 is passed through the first transfer nip portions, toner images are successively transferred to the intermediate transfer belt 621 from the photoreceptor drum 613 and superimposed on the intermediate transfer belt 621 respectively as a first transfer process. More specifically, a first transfer bias voltage is applied to the first transfer roller 622 in order to charge the rear surface (which contacts the first transfer roller 622) of the intermediate transfer belt 621 with electricity of the polarity opposite to that of toner so that the toner images are electrostatically transferred to the intermediate transfer belt 621.

After transferred to the intermediate transfer belt 621, the superimposed toner image on the intermediate transfer belt 621 is transferred to the paper medium P which is passed through the second transfer nip portion as a second transfer process. More specifically, a second transfer bias voltage is applied to the second transfer roller 623 in order to charge the back side of the paper medium P, i.e. the side which contacts the second transfer roller 623, with electricity of the polarity opposite to that of toner so that the superimposed toner image is electrostatically transferred to the paper medium P. The paper medium P with the transferred toner image is conveyed to the fixing unit 630.

The belt cleaning unit 624 includes a belt cleaning blade, which is in slidable contact with the surface of the intermediate transfer belt 621, and so forth. The belt cleaning unit 624 removes toner which remains on the surface of the intermediate transfer belt 621 after the second transfer process.

Meanwhile, in the intermediate transfer unit 620, the function of the second transfer roller 623 can be implemented by an alternative structure, i.e., a so-called belt-type second transfer unit, consisting of a second transfer belt (not shown in the figure) which is wound around a plurality of support rollers including the second transfer roller 623 in the form of a loop.

The fixing unit 630 is provided with a heat roller 631, a pressure roller 632, a heating unit 633 and a temperature detection unit 83 to fix a toner image transferred by the image forming unit 60 to a paper medium P.

Specifically, the heating unit 633 is located in the heat roller 631 to intermittently heat the heat roller 631. The pressure roller 632 is located opposite to the heat roller 631 to apply a pressure to the heat roller 631. The temperature detection unit 83 is located near the heat roller 631 to detect the temperature of the heat roller 631. The sampling frequency of the temperature detection unit 83 is for example 100 ms.

The fixing unit 630 heats the heat roller 631 with the heating unit 633 in accordance with the detection result of the temperature detection unit 83. The fixing unit 630 forms a fixing nip between the heat roller 631 and the pressure roller 632 which are urged against each other.

The fixing unit 630 fixes the toner image, which is transferred by the image forming unit 60, to a paper medium P under the pressure applied by the pressure roller 632 and the heat applied through the heat roller 631. An image is printed on the paper medium P by the fixing process of the fixing unit 630. After printing the image, the paper medium P is discharged outwards, as the output sheet P', by discharging rollers 304, and for example conveyed to the image reading apparatus 4. Incidentally, the paper medium P and the output sheet P' are collectively referred to simply as a sheet when they need not be distinguished.

The paper feed unit 20 is provided with paper feed cassettes 200, feed rollers 201 and the like. The paper feed cassette 200 accommodates sheets P. The feed rollers 201 take in the sheets P accommodated in the paper feed cassette 200 and feed the sheets P to the conveyance unit 30.

The conveyance unit 30 includes a conveying route 300. The conveyance unit 30 conveys a paper medium P along the conveying route 300. The conveying route 300 is provided with paper feed rollers 302A, conveyance rollers 302B, 302C and 302D, a paper stop roller 303 and so forth.

The conveying route 300 conveys a paper medium P fed from the paper feed unit 20 to the image forming unit 60. Meanwhile, in the case where an image is to be formed also on the back side of a paper medium P, the paper medium P is conveyed through the conveying route 300 to a paper circulation route 307A by a branch section 306 after forming an image on the front side of the paper medium P. The paper medium P conveyed to the paper circulation route 307A is then conveyed from a sheet reversing route 307B to a refeeding conveying route 307C.

The control unit 41 consists mainly of a CPU, a ROM, a RAM, and an I/O interface. The CPU of the control unit 41 reads various programs from the ROM or a storage unit which is not shown in the figure in accordance with required processes, loads the programs on the RAM, and executes the loaded programs to cooperate with the control unit 41 and control the operation of each element of the image forming apparatus 3. Namely, the control unit 41 serves as a processor which performs various processes.

Figure 3:
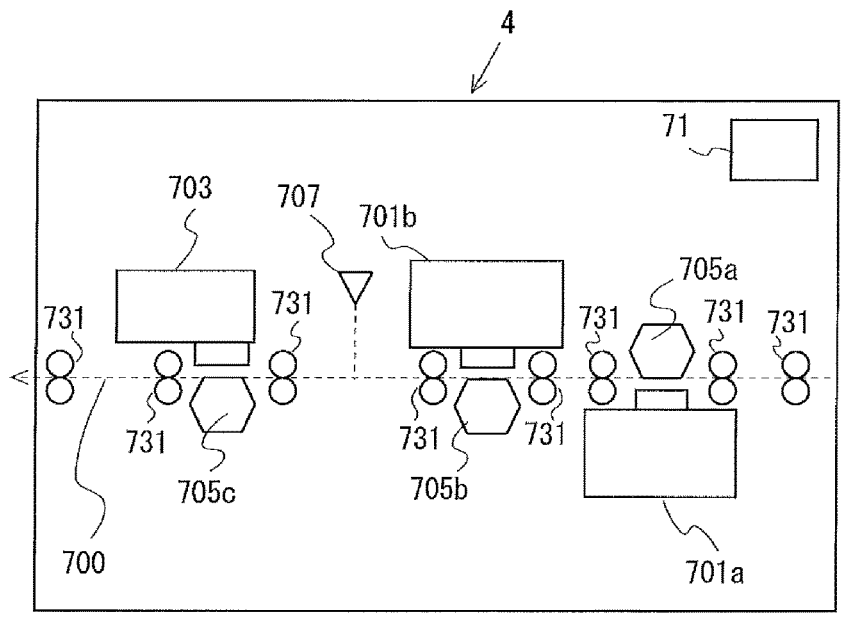
FIG. 3 is a view for showing an example of the configuration of an image reading apparatus 4 in accordance with the embodiment 1 of the present invention.

FIG. 3 is a view for showing an example of the configuration of the image reading apparatus 4 in accordance with the embodiment 1 of the present invention. The image reading apparatus 4 is configured to operate as either an in-line system or an offline system. The in-line system provides a configuration in which the image reading apparatus 4 is directly fed with the output sheet P' which is supplied from the image forming apparatus 3. On the other hand, the offline system provides a configuration in which the image forming apparatus 3 and the image reading apparatus 4 are designed independently from each other. The following explanation of the present embodiment is based on the assumption that an in-line system is used. However, an offline system can be used instead.

The image reading apparatus 4 is arranged in the downstream side of the image forming apparatus 3 and responsible for reading an image printed on one or both side of the output sheet P'. Specifically, the image reading apparatus 4 obtains correction amounts of an image printed on the output sheet P' based on the reading results such as the color, position and magnification factor of the image, and feeds back the correction amounts of the image to the image forming apparatus 3.

The image reading apparatus 4 is provided with a control unit 71, a first scanner 701a, a second scanner 701b, a spectrophotometer 703, calibration members 705a through 705c, conveyance rollers 731, and a paper path 700. The paper path 700 is provided in the image reading apparatus 4, and the output sheet P' is passed therethrough. The conveyance rollers 731 are driven to convey the output sheet P' through the paper path 700.

The image reading apparatus 4 is provided with an edge detection unit 707. The edge detection unit 707 is located between the second scanner 701b and the spectrophotometer 703 to detect the edge of the output sheet P' which is passed through the paper path 700. The edge detection unit 707 is implemented with a reflection type sensor.

Receiving the output sheet P' supplied from the image forming apparatus 3, for example, the image reading apparatus 4 detects an image formed on the output sheet P' with the first scanner 701a, the second scanner 701b and the spectrophotometer 703. The detection result of the image is output to the control unit 71.

Specifically, the first scanner 701a and the second scanner 701b are arranged to face the output sheet P' which is passed through the paper path 700. The first scanner 701a and the second scanner 701b read an image printed on the output sheet P'.

The first scanner 701a reads the back side of the output sheet P'. The reading result of the first scanner 701a is used, for example, to check misalignment between images printed on the front and back sides of the output sheet P', the existence of an extraordinary image or the like. On the other hand, the second scanner 701b reads the front side of the output sheet P'. Specifically, the second scanner 701b reads an image printed on the output sheet P' such as patches. While the output sheet P' is conveyed, the second scanner 701b reads the color of patches formed on the output sheet P' along the direction perpendicular to the moving direction of the output sheet P'.

Incidentally, the first scanner 701a and the second scanner 701b are referred to simply as the scanner 701 when they need not be distinguished. Also, the calibration members 705a to 705c are referred to simply as the calibration member 705.

The spectrophotometer 703 is arranged to face the output sheet P' passing along the paper path 700 in the downstream side of the scanner 701. For example, the spectrophotometer 703 guarantees the absolute value of the color of an image formed on the output sheet P' by colorimetrically measuring patches printed on the output sheet P'.

Specifically, the spectrophotometer 703 radiates visible light to the patches from a light source 745 to be described below with reference to FIG. 8. The spectrophotometer 703 acquires an optical spectrum of the light reflected by the calibration member 705c. The spectrophotometer 703 derives tristimulus values (X, Y and Z) based on optical data which is obtained from the acquired optical spectrum. The spectrophotometer 703 calculates color values based on the tristimulus values (X, Y and Z). Specifically, the color values are represented in a predetermined color model such as an orthogonal coordinate system or a circular cylindrical coordinate system to derives color tones of the patches. The color values are output to the control unit 71, the control unit 41 or the image processing unit 43.

Incidentally, the colorimetric range, i.e., the viewing angle of the spectrophotometer 703 is narrower than the reading area of the scanner 701, and narrower than the width of the patches in the sheet width direction of the output sheet P'. Specifically, a lens section which receives the light reflected from the patches has, for example, a diameter of about 4 mm.

Since colorimetric measurement is performed within a limited range of viewing angle in this manner, the spectrophotometer 703 can generate color values with higher accuracy than the scanner 701.

The control unit 71 corrects the read values of patches read by the scanner 701 based on the color values of the patches measured by the spectrophotometer 703. Specifically, the image processing unit 43 associates the color values of the patches measured by the spectrophotometer 703 with the read values of the patches read by the scanner 701. Since the color values of the patches measured by the spectrophotometer 703 and the read values of the patches read by the scanner 701 are associated with each other, the colorimetrically measurement result of the spectrophotometer 703 can be reflected in the reading result of the scanner 701 to obtain an accurate correction amount.

Incidentally, the color read values of patches read by the scanner 701 can be represented by image data (R, G, B) based on the RGB color model. On the other hand, the color values of the patches measured by the spectrophotometer 703 can be represented by colorimetric values (L*, a*, b*) based on the CIELAB color space. Accordingly, the image data (R, G, B) based on the RGB color model can be associated with the colorimetric values (L*, a*, b*) based on the CIELAB color space.

The image processing unit 43 optimizes an image formed by the image forming unit 60 based on the correction amount of patches. The process of optimizing images to be performed by the image processing unit 43 includes positional adjustment of images to be printed on the front and back sides of a paper medium P, adjustment of densities and so forth.

Namely, the image processing unit 43 corrects the color, position or magnification factor of an image formed on a paper medium P in accordance with the reading result of the output sheet P' of the image reading apparatus 4. Specifically, the image processing unit 43 corrects the image formed on the paper medium P based on the corrected color values of patches. When an image is formed on a new paper medium P, the image processing unit 43 outputs, to the image forming unit 60, a command to form the image on the paper medium P.

Incidentally, the calibration member 705a is arranged to face the first scanner 701a. The calibration member 705b is arranged to face the second scanner 701b. The calibration members 705a and 705b are structured to reflect irradiation light to be radiated to the paper medium P when reading an image. The light reflecting surface of the calibration member 705 is preferably white.

Figure 4:
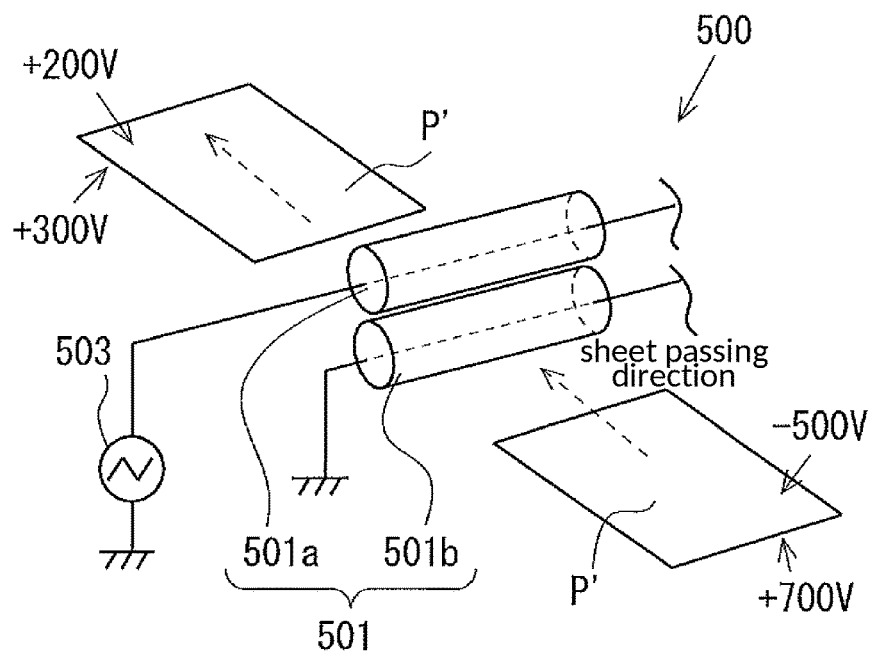
FIG. 4 is a view for showing an exemplary internal structure of a charge applicator 500 in accordance with the embodiment 1 of the present invention.

FIG. 4 is a view for showing an exemplary internal structure of the charge applicator 500 in accordance with the embodiment 1 of the present invention. As shown in FIG. 4, the charge applicator 500 is provided with a first application rollers 501a and 501b to apply a high voltage bias from a charge application power supply 503. The first application rollers 501a and 501b have longer widths in the longitudinal direction than the output sheet P' in order to apply charge to the entirety of the width of the output sheet P'. The charge application power supply 503 applies, for example, an alternating voltage. However, a direct voltage supply can be used to apply the first application rollers 501a and 501b with either a positive voltage or a negative voltage.

Before the output sheet P' reaches the first application rollers 501a and 501b, for example as illustrated in FIG. 4, the first surface of the output sheet P' is charged to −500V, and the second surface of the output sheet P' is charged to +700V. After the output sheet P' is passed through the first application rollers 501*a* and 501*b*, the first surface of the output sheet P' is charged to +200V, and the second surface of the output sheet P' is charged to +300V. The differential potential between the front and back sides of the output sheet P' is thereby reduced from 1200V to 100V, so that the sticking force between the output sheet P' of FIG. 4 and another output sheet which is not shown in FIG. 4 is decreased. Also, the first application rollers 501*a* and 501*b* are referred to simply as the first application roller 501.

Figure 5:
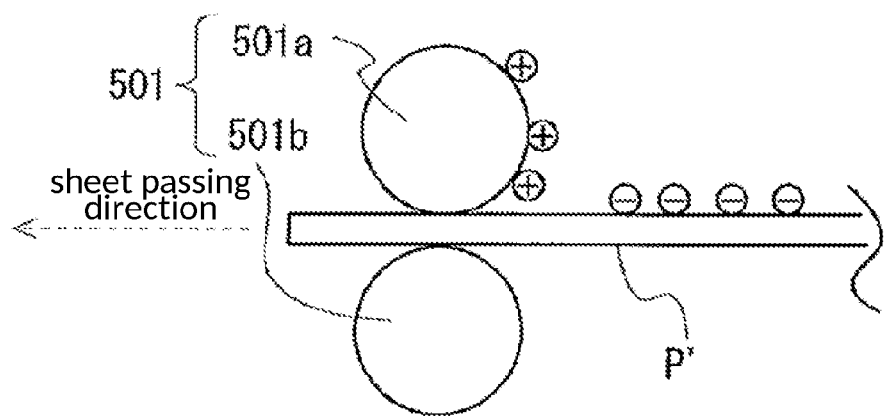
FIG. 5 is a schematic view for showing an example of charge application by a first application roller 501 in accordance with the embodiment 1 of the present invention.

FIG. 5 is a schematic view for showing an example of charge application by the first application roller 501 in accordance with the embodiment 1 of the present invention. As shown in FIG. 5, the charge applicator 500 switches charge to be applied to the pair of first application rollers 501 to either positive or negative charge.

Figure 6:
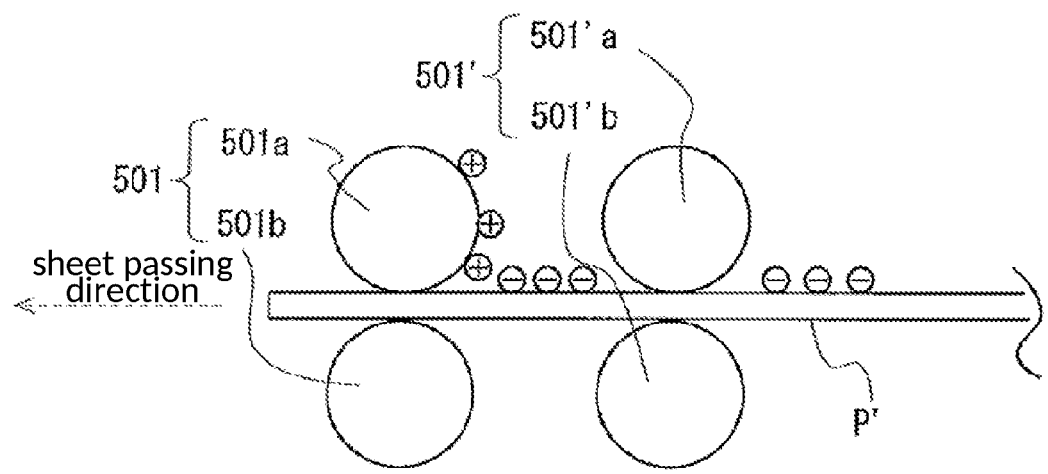
FIG. 6 is a schematic view for showing an example of charge application by the first application rollers 501 and second application rollers 501' in accordance with the embodiment 1 of the present invention.

FIG. 6 is a schematic view for showing an example of charge application by the first application rollers 501 and second application rollers 501' in accordance with the embodiment 1 of the present invention. In the example of FIG. 6, the second application rollers 501*a*' and 501*b*' are provided in addition to the first application rollers 501*a* and 501*b*. Likewise the first application roller 501, the second application rollers 501*a*' and 501*b*' are referred to simply as the second application roller 501'. As illustrated in FIG. 6, the charge applicator 500 applies a much amount of positive charge to the output sheet P' by the first application roller 501 and the second application roller 501'.

Figure 7:
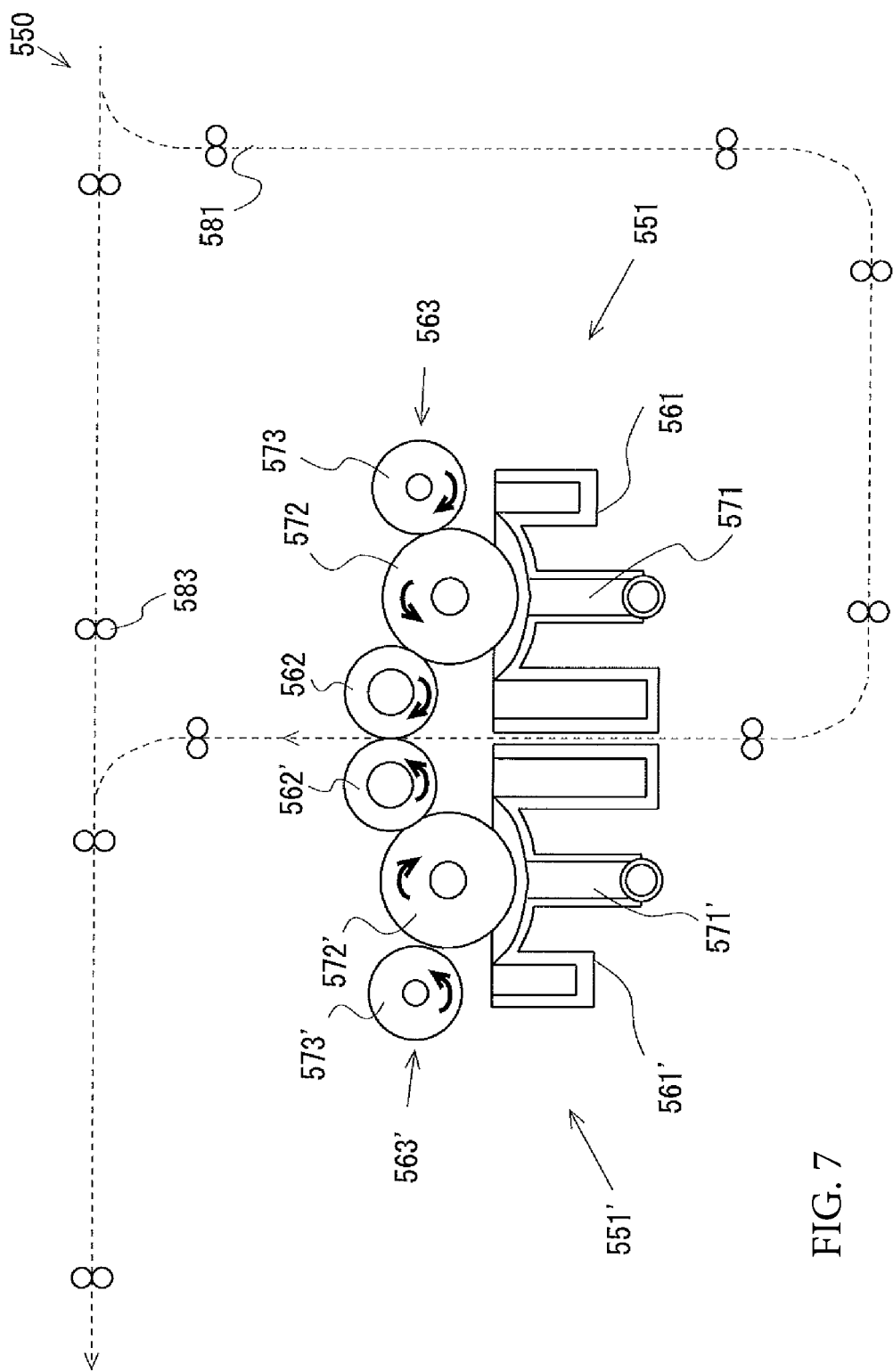
FIG. 7 is a schematic view for showing an exemplary internal structure of a humidifier 550 in accordance with the embodiment 1 of the present invention.

FIG. 7 is a view for showing an exemplary internal structure of the humidifier 550 in accordance with the embodiment 1 of the present invention. As shown in FIG. 7, the humidifier 550 includes a first humidification section 551 arranged in the right side of the inside of the housing of the humidifier 550, and a second humidification section 551' arranged in the left side of the inside of the housing of the humidifier 550. The first humidification section 551 is located to face the first surface of the output sheet P' which is passed through the paper path 581 by paper path rollers 583. The first humidification section 551 humidifies the first surface of the output sheet P'. The second surface of the output sheet P' is the opposite surface of the first surface of the output sheet P'. The second humidification section 551' humidifies the second surface of the output sheet P'.

The first humidification section 551 is provided with a first water storage section 561, a first humidifying roller 562 and a first transmission section 563. The first transmission section 563 is provided with a first water supply section 571, a first water supply roller 572 and a first drainer roller 573.

The second humidification section 551' is provided with a second water storage section 561', a second humidifying roller 562' and a second transmission section 563'. The second transmission section 563' is provided with a second water supply section 571', a second water supply roller 572' and a second drainer roller 573'.

The first water storage section 561 is connected to the first water supply section 571 and stores liquid supplied from the first water supply section 571. The first transmission section 563 transmits the liquid from the first water storage section 561 to the first humidifying roller 562. The first water supply roller 572 supplies the liquid from the first water storage section 561 to the first humidifying roller 562 through a nip portion formed between the first water supply roller 572 and the first humidifying roller 562. The first drainer roller 573 forms a nip portion with the first water supply roller 572 therebetween. The first drainer roller 573 is in pressure contact with the first water supply roller 572 through the nip portion between the first drainer roller 573 and the first water supply roller 572 to scrape a liquid layer formed on the surface of the first water supply roller 572.

The second water storage section 561' is connected to the second water supply section 571' and stores the liquid supplied from the second water supply section 571'. The second transmission section 563' transmits the liquid from the second water storage section 561' to the second humidifying roller 562'. The second water supply roller 572' supplies the liquid from the second water storage section 561' to the second humidifying roller 562'. The second drainer roller 573' forms a nip portion with the second water supply roller 572' therebetween. The second drainer roller 573' is in pressure contact with the second water supply roller 572 through the nip portion between the second drainer roller 573' and the second water supply roller 572' to scrape a liquid layer formed on the surface of the second water supply roller 572'.

Figures 8, 9:
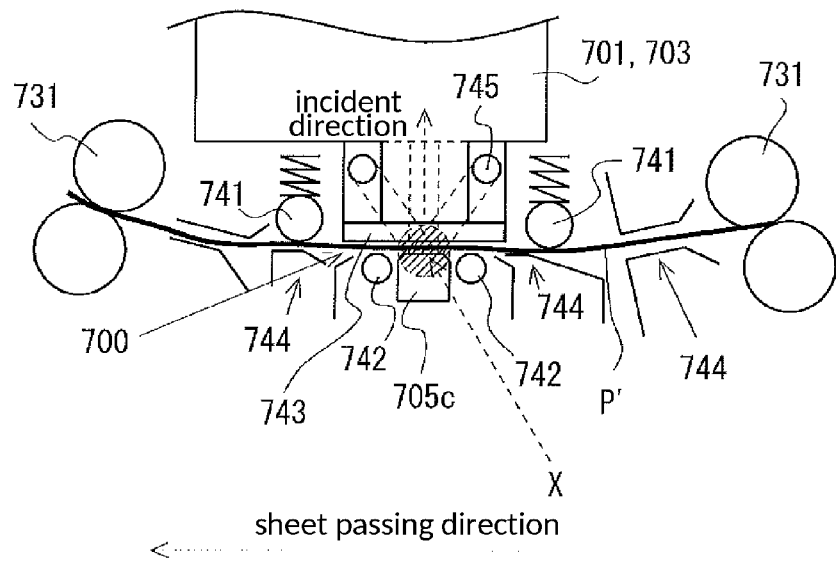
FIG. 8 is a schematic view for showing an example of a paper path 700 which is installed in the image reading apparatus 4 in accordance with the embodiment 1 of the present invention.
FIG. 9 is a view for explaining a triboelectric charging series in accordance with the embodiment 1 of the present invention.

FIG. 8 is a schematic view for showing an example of the paper path 700 which is installed in the image reading apparatus 4 in accordance with the embodiment 1 of the present invention. As shown in FIG. 8, the paper path 700 is formed of paper guide members 744, movable rollers 741, fixed rollers 742, the calibration member 705*c*, an objective glass section 743 and so forth to pass the output sheet P' therethrough. The paper guide member 744 located in the upstream side serves to guide the output sheet P', which is conveyed from the conveyance rollers 731 in the upstream side, toward the downstream side. The movable rollers 741 can move in the vertical direction, and inhibits the output sheet P' from flapping with a resilient member. The fixed rollers 742 is located to face the objective glass section 743 to inhibit the output sheet P' from flapping. The paper guide member 744 located in the downstream side serves to guide the output sheet P', which is passed through the scanner 701 and the spectrophotometer 703, toward the conveyance rollers 731 in the downstream side. The scanner 701 and the spectrophotometer 703 read light emitted from the light source 745 and reflected from the output sheet P'.

FIG. 9 is a view for explaining a triboelectric charging series in accordance with the embodiment 1 of the present invention. The triboelectric charging is a type of contact electrification in which a certain voltage is generated between different materials by charge transfer one from the other after they come into frictional contact with each other. The triboelectric charging generates a high voltage when separating different materials from each other after frictional contact. These processes are expressed such that static electricity occurs. Also, the electricity generated by these processes is called frictional electricity.

Incidentally, triboelectric charging generates a differential potential because of positive or negative charge exchanged between materials due to the differential work function when the materials come in contact with each other. The triboelectric charging series depends on the kinds of materials. For example, in the examples as shown in FIG. 8, when the output sheet P' is conveyed with the objective glass section 743 being in contact with the output sheet P', the output sheet P' tends to be positively charged.

Namely, for the purpose of accurately reading the position and density of an image prined on the output sheet P', the scanner 701 is arranged with a narrower gap, through which the output sheet P' is passed, in a reading position X shown in FIG. 8 in order to inhibit height variation and speed variation of the output sheet P' during reading with the scanner 701. This gap is formed between one side of the objective glass section 743 and the other side of the calibration member 705*c*. The objective glass section 743 is made mainly of a smooth glass. Surface contact between the output sheet P' and the smooth glass may generate friction. In this case, as understood from the positions of paper and glass in the triboelectric charging series, the surface of the output sheet P' gets more positive charge than when the output sheet P' is passed through other members so that a greater attractive or repulsive force is generated by static electricity. Accordingly, there is a fear of increasing quality defects such as paper jam with scraps remaining after punching, folding position displacement due to misalignment, attachment of trimming scraps or the like during a post-printing process such as punching, folding, stitching, trimming, stacking or the like.

Meanwhile, in the case where the paper guide members 744 shown in FIG. 8 are made of a metallic plate, and the conveyance rollers 731, the movable rollers 741 and the fixed rollers 742 are made of a resin, since the metallic plate is ground and has an internal resistance of 0Ω, such a phenomenon that only the members made of a resin are charged happens. In practice, the internal resistance of a member depends on the material of the member.

Figure 10:
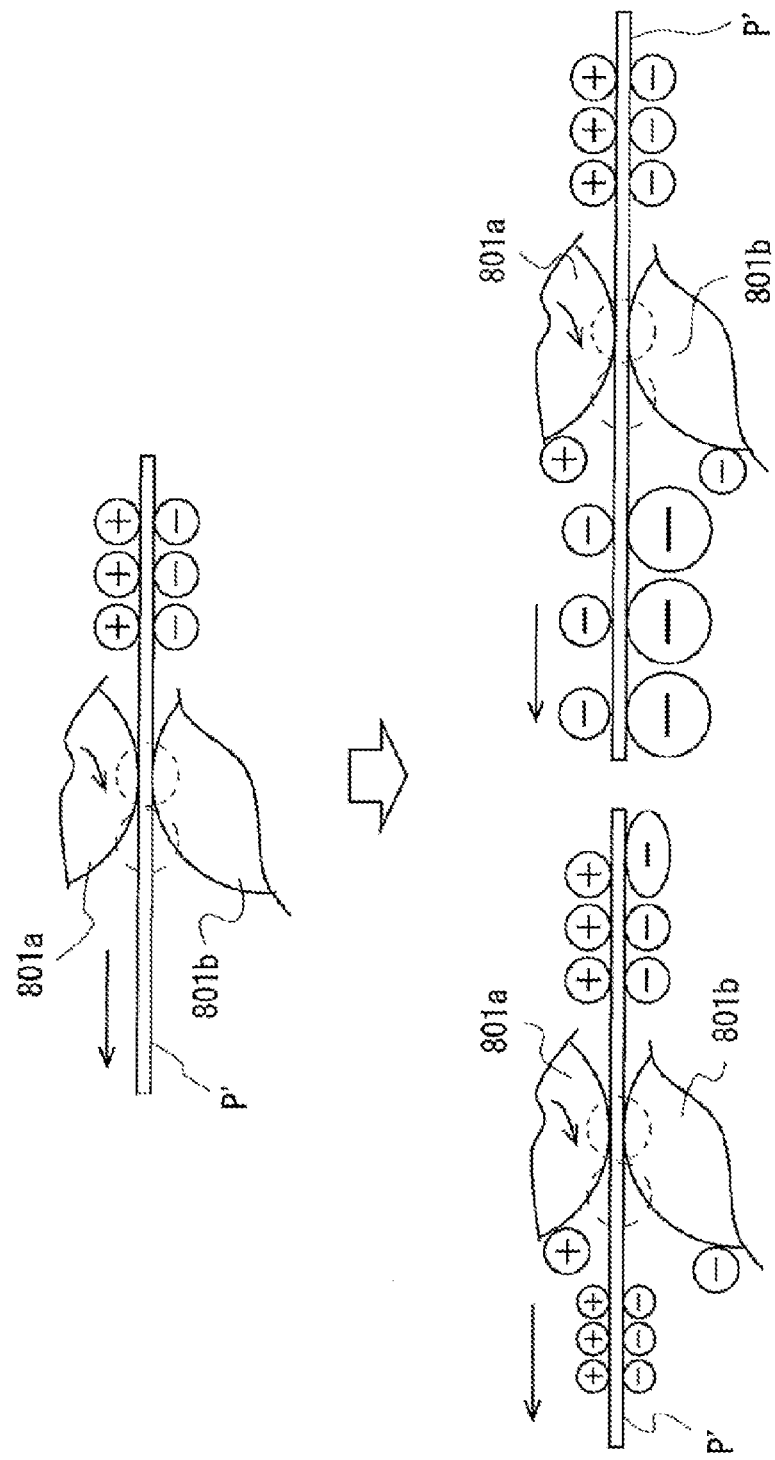
FIG. 10 is a schematic view for showing examples of peeling charge and friction charge in accordance with the embodiment 1 of the present invention.

FIG. 10 is a schematic view for showing examples of peeling charge and friction charge in accordance with the embodiment 1 of the present invention. Conveyance rollers 801*a* and 801*b* shown in FIG. 10 generally represent the various rollers which are described in the above. The conveyance rollers 801*a* and 801*b* convey the output sheet P' by applying a pressure and rotational force thereto so that a conveyance energy is determined by the pressure and rotational force. Such a conveyance energy is converted to an electric potential by friction charge. Specifically, peeling charge is generated when the output sheet P is separated from a nip portion between the conveyance roller 801*a* and the conveyance roller 801*b*. Also, friction charge is generated when the conveyance rollers 801*a* and 801*b* microslip on the output sheet P' at the nip portion between the conveyance roller 801*a* and the conveyance roller 801*b*. On the other hand, if the paper guide members 744 are made of a metal such as a metallic plate, the paper guide members 744 are ground so that charge is transferred to the paper guide members 744.

Such peeling charge, friction charge, charge transfer or the like cannot be easily controlled, but easily influenced by a temperature and a humidity environment on sheet conveying routes, the paper quality of the sheet P', the toner amount attached to the sheet P', the charged quantity of the paper guide members 744 or the like. Also, the greater the potential difference between the front and back sides of a charged output sheet P' increases, the greater the attractive force exerted between the output sheets P' increases. Accordingly, if a post-printing process is performed with the output sheets P' stuck together by the attractive force exerted therebetween, the quality of the post-printing process may be degraded. It is thereby needed to perform processes with greater energy for preventing the quality of a post-printing process from being degraded.

As explained above in the present embodiment, it is thereby possible to improve the efficiency of a series of processes and perform the series of processes in a better environment, i.e., requiring a smaller energy.

In other words, the image forming system 1 of the present embodiment is provided with the image reading apparatus 4, the paper path 700 and the electricity eliminator 5. The electricity eliminator 5 is located in the upstream side of the finisher 6 and eliminate the static electricity of a sheet caused when the sheet is passed through the paper path 700.

The electricity eliminator 5 applies at least one of water and charge to the front and back sides of a sheet.

Accordingly, the differential potential between the front and back sides of a sheet becomes small in the upstream side of the finisher 6. It is therefore possible to prevent degradation of the quality of a post-printing process due to static electricity of a sheet which is conveyed from the image reading apparatus 4 to the finisher 6.

Figure 15:
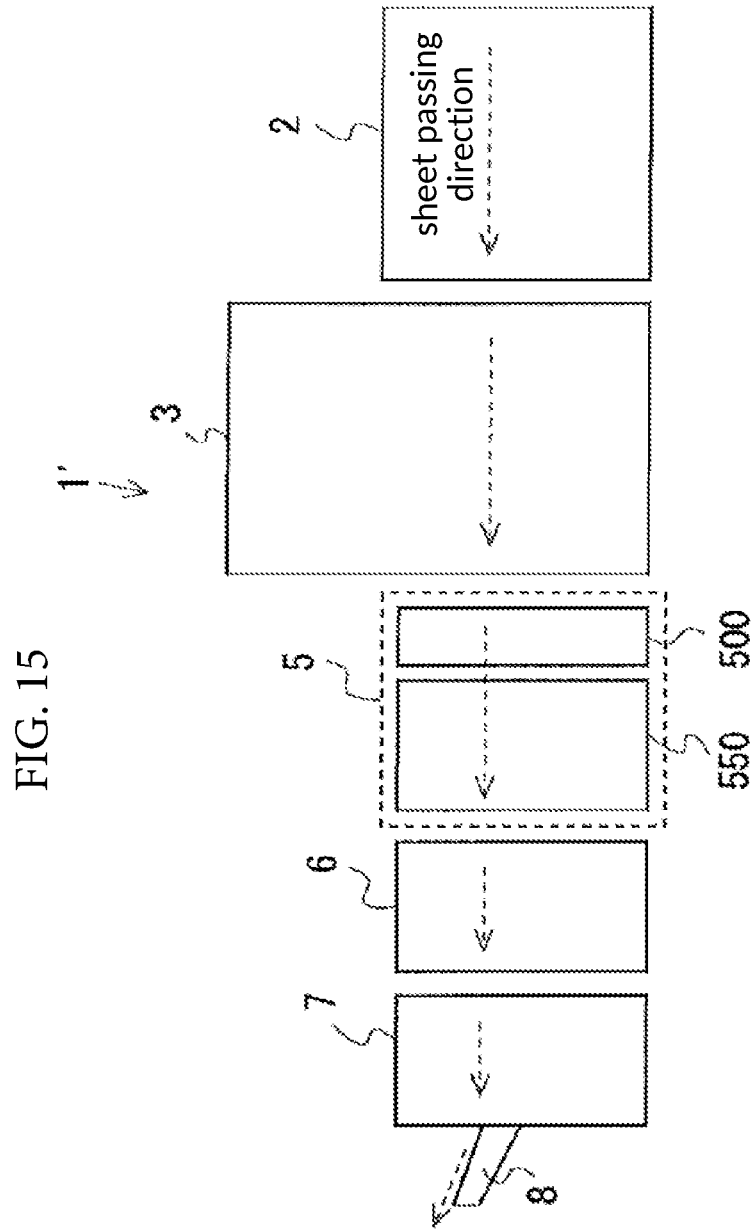
FIG. 15 is a schematic view for showing an example of the overall configuration of an image forming system 1' in accordance with a prior art.

FIG. 15 is a schematic view for showing an example of the overall configuration of an image forming system 1' in accordance with a prior art. As illustrated in FIG. 15, the image forming system 1' includes a paper feed apparatus 2, an image forming apparatus 3, an electricity eliminator 5, a finisher 6, and a sheet discharger 7. Accordingly, since the image forming system 1' is not provided with an image reading apparatus 4, this is not a system in which an image reading apparatus 4 is connected to a finisher 6. In this case, since a sheet need not be passed through a narrow gap, there is little fear that sheets are stuck together by friction charge or the like.

On the other hand, in the case of the present embodiment as explained above, the image forming system 1 is a system in which the image reading apparatus 4 is connected to the finisher 6. In this case, since a sheet has to be passed through a narrow gap, there is a fear that sheets are stuck together by friction charge or the like.

The electricity eliminator 5 is thereby provided with the humidifier 550. The humidifier 550 can be placed in an arbitrary position between the image forming apparatus 3 and the finisher 6 to apply water to the front and back sides of a sheet. Accordingly, since both the front and back sides of a sheet are humidified, transportation of charge on the sheet can be made easy. Namely, charge on a sheet can be easily conducted to ground through water so that uneven electrification of the sheet can be made flat.

In addition to this, the electricity eliminator 5 is provided with the charge applicator 500. The charge applicator 500 can be freely arranged between the image forming apparatus 3 and the finisher 6, and serves to apply charge to the front and back sides of a sheet P. In this case, the charge applicator 500 is located in the upstream side of the humidifier 550. Accordingly, since charge is applied to both the front and back sides of a sheet, the electricity of the sheet can be neutralized. Namely, since the total amount of charge on a sheet can be stabilized, it is possible to prevent sheets from sticking to each other due to the differential potential between the sheets.

Furthermore, in the case of the image forming system 1 of the present embodiment, both the humidifier 550 and the charge applicator 500 are arranged in the downstream side of the image reading apparatus 4. Charge and humidity are thereby applied to a sheet in advance of conveying the sheet to the finisher 6. The finisher 6 therefore performs a post-printing process with a sheet after performing neutralization of charge on the sheet and humidifying the sheet. Accordingly, even if static electricity occurs on a sheet by passing the sheet through the image reading apparatus 4, the static electricity on the sheet can be lessened before the sheet is conveyed to the finisher 6.

Also, the image reading apparatus 4 of the present embodiment is provided with the first scanner 701*a*, the second scanner 701*b* and the spectrophotometer 703. The first scanner 701*a* is arranged along the paper path 700 in order to read a first image which is formed on a first surface which is either one of the front and back sides of a sheet. The second scanner 701*b* is arranged along the paper path 700 in the downstream side of the first scanner 701*a* in order to read a second image which is formed on a second surface which is the other of the front and back sides of the sheet. The spectrophotometer 703 is arranged along the paper path 700 in the downstream side of the second scanner 701*b* in order to colorimetrically measure either the first image or the second image.

In other words, the image reading apparatus 4 corrects the color tones of an image formed on a sheet based on the reading result of the first image by the first scanner 701*a*, the reading result of the second image by the second scanner 701*b* and the colorimetric measurement result of either one of the first image or the second image by the spectrophotometer 703.

Namely, by passing a sheet only once, it is possible to read a first image which is formed on a first surface of the sheet and a second image which is formed on a second surface of the sheet and colorimetrically measure either one of the first image or the second image. Accordingly, it is possible to effectively feed back the reading results of the first and second images.

Embodiment 2.

In this embodiment 2, similar elements are given similar references as in the embodiment 1, and therefore no redundant description is repeated. The embodiment 2 differs from the embodiment 1 in the position where the electricity eliminator 5 is arranged.

Figure 11:
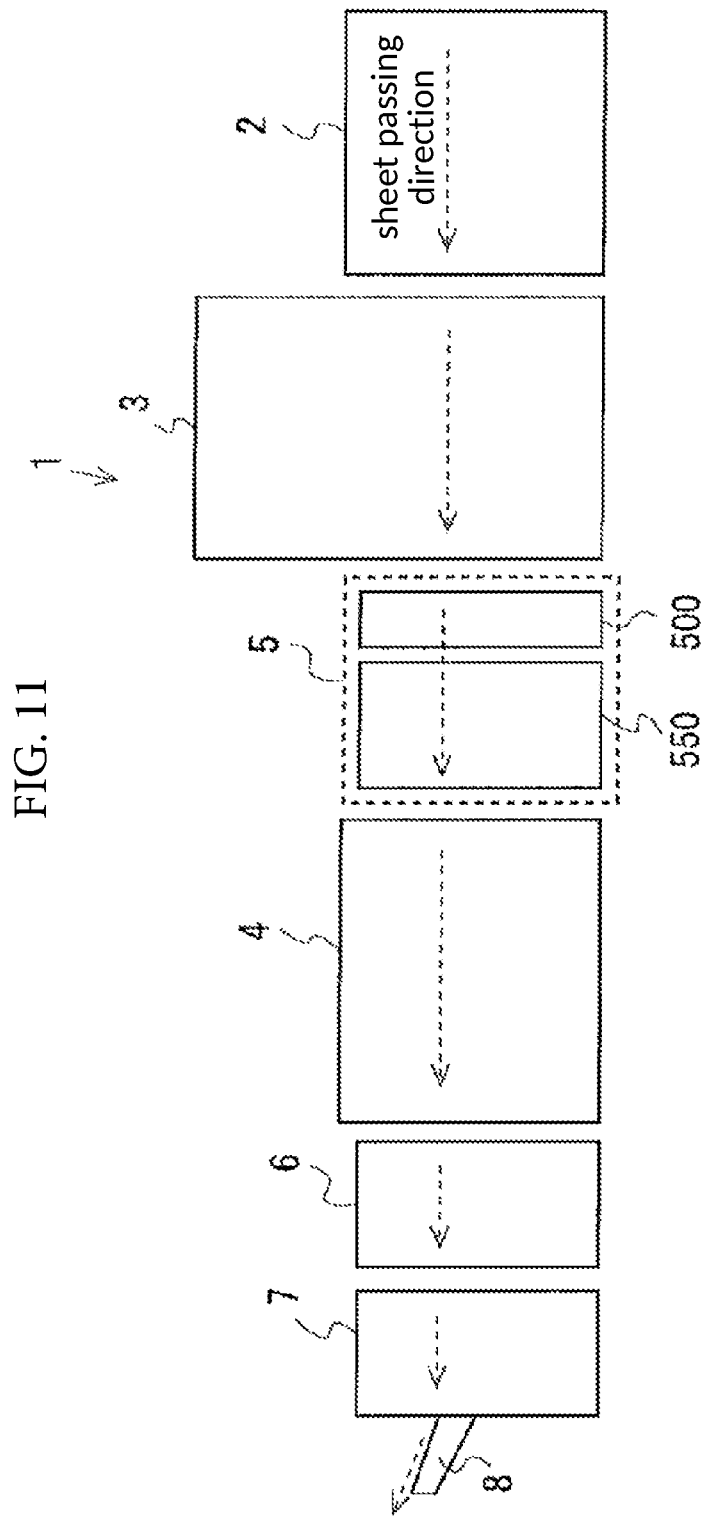
FIG. 11 is a schematic view for showing an example of the overall configuration of an image forming system 1 in accordance with an embodiment 2 of the present invention.

FIG. 11 is a schematic view for showing an example of the overall configuration of an image forming system 1 in accordance with the embodiment 2 of the present invention. As shown in FIG. 11, in the image forming system 1, both the humidifier 550 and the charge applicator 500 are arranged in the upstream side of the image reading apparatus 4 and in the downstream side of the image forming apparatus 3.

Charge and humidity are thereby applied to a sheet in advance of conveying the sheet to the image reading apparatus 4. Accordingly, the image reading apparatus 4 reads an image formed on a sheet after performing neutralization of charge on the sheet and humidifying the sheet. As a result, even if the sticking force between sheets is increased by charge on the contact surface between the sheets due to the uneven distribution of neutralized charge pairs, transportation of charge on the sheet is accelerated so that uneven electrification of the sheet can be made flat in advance.

Embodiment 3.

In this embodiment 3, similar elements are given similar references as in the embodiment 1 and the embodiment 2, and therefore no redundant description is repeated. The embodiment 3 differs from the embodiments 1 and 2 in the positions where the humidifier 550 and the charge applicator 500 are placed.

Figure 12:
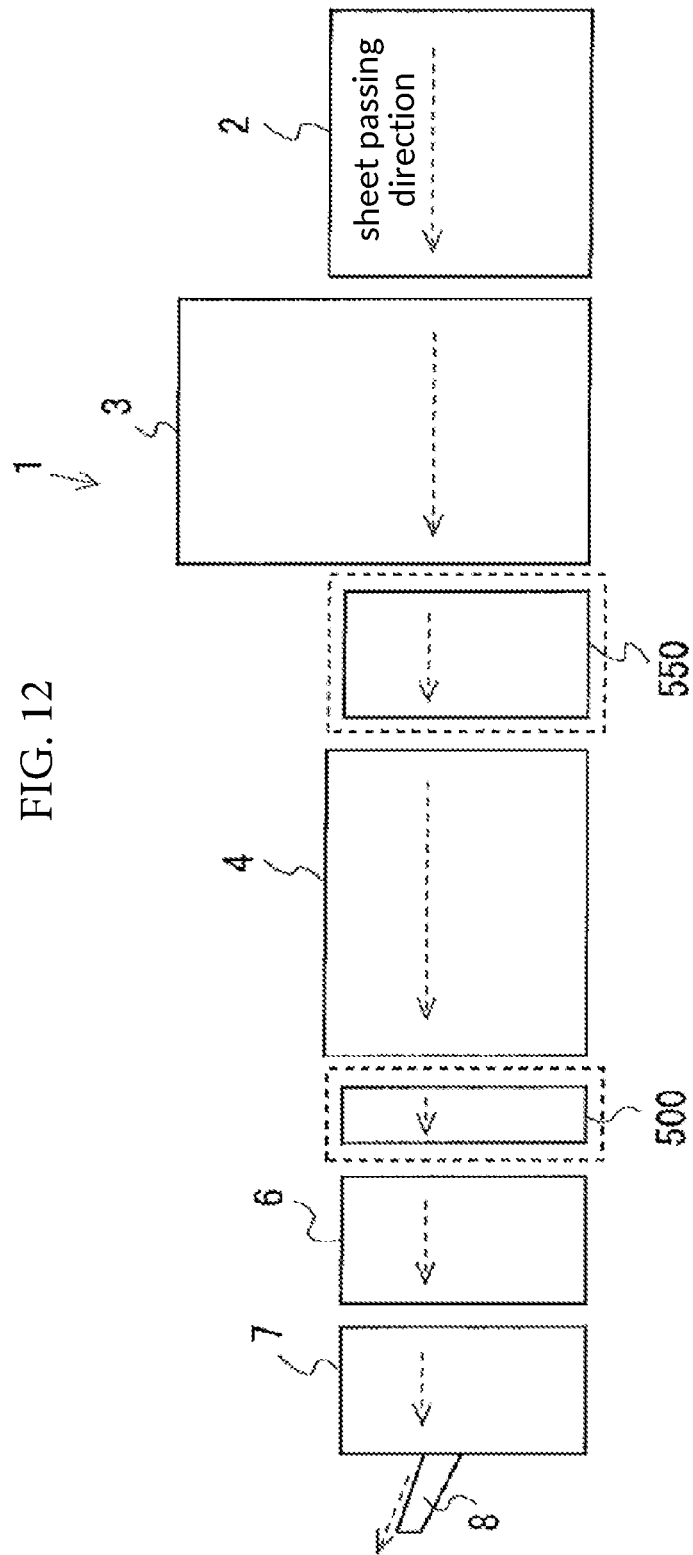
FIG. 12 is a schematic view for showing an example of the overall configuration of an image forming system 1 in accordance with an embodiment 3 of the present invention.

FIG. 12 is a schematic view for showing an example of the overall configuration of an image forming system 1 in accordance with the embodiment 3 of the present invention. In the image forming system 1 shown in FIG. 12, the humidifier 550 is arranged in the upstream side of the image reading apparatus 4 and in the downstream side of the image forming apparatus 3, and the charge applicator 500 is arranged in the downstream side of the image reading apparatus 4.

Humidity is thereby applied to a sheet in advance of conveying the sheet to the image reading apparatus 4. Accordingly, since humidification cools a sheet, while reducing curl of a sheet and friction charge, the influence of thermochromism can be lessened when an image is read.

Embodiment 4.

In this embodiment 4, similar elements are given similar references as in the embodiments 1 through 3, and therefore no redundant description is repeated. The embodiment 4 differs from the embodiments 1 through 3 in the positions where the humidifier 550 and the charge applicator 500 are placed.

Figure 13:
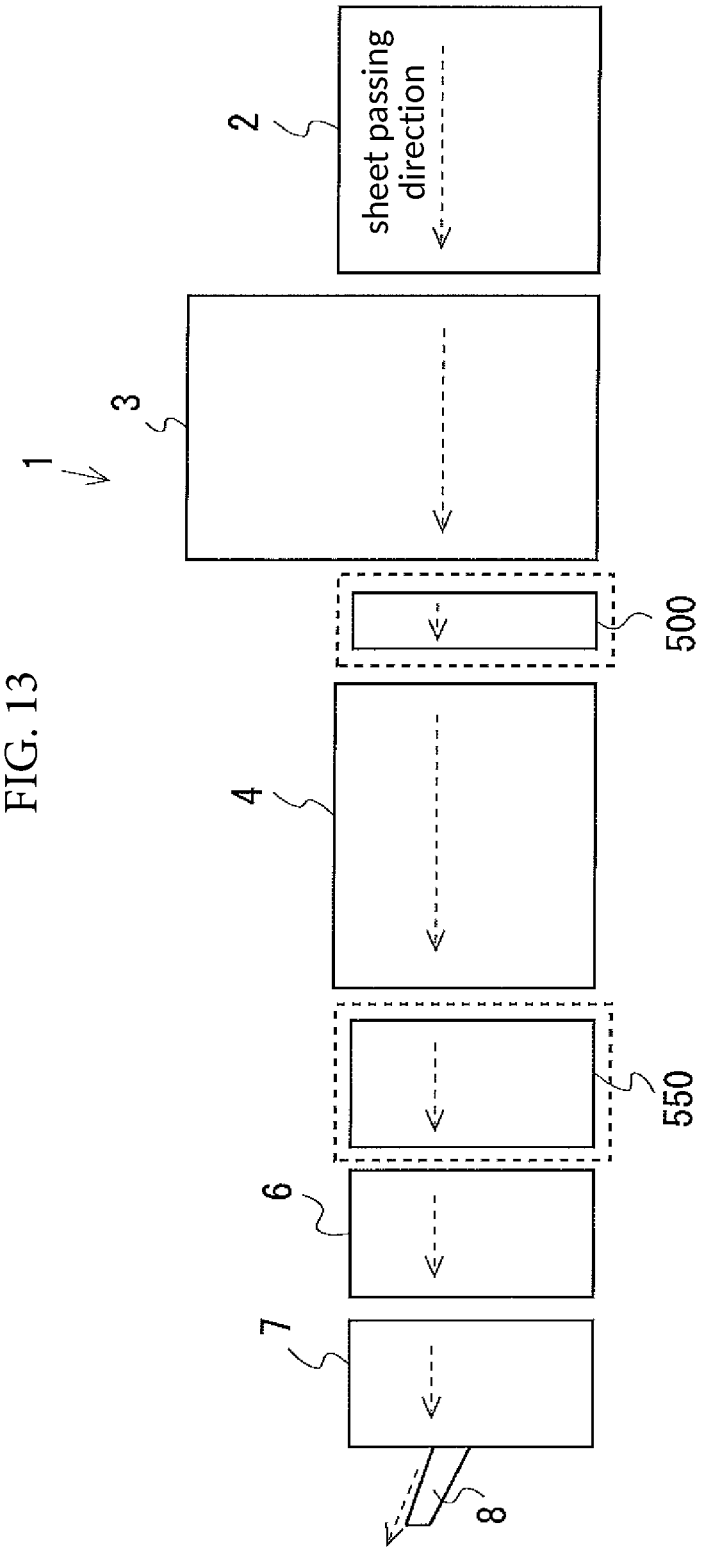
FIG. 13 is a schematic view for showing an example of the overall configuration of an image forming system 1 in accordance with an embodiment 4 of the present invention.

FIG. 13 is a schematic view for showing an example of the overall configuration of an image forming system 1 in accordance with the embodiment 4 of the present invention. In the image forming system 1 shown in FIG. 13, the charge applicator 500 is arranged in the upstream side of the image reading apparatus 4 and in the downstream side of the image forming apparatus 3, and the humidifier 550 is arranged in the downstream side of the image reading apparatus 4.

Accordingly, uneven electrification of a sheet can be made flat after the sheet is passed through the image reading apparatus 4. It is therefore possible to obtain high electricity elimination effects before post-printing processes.

Embodiment 5.

In this embodiment 5, similar elements are given similar references as in the embodiments 1 through 4, and therefore no redundant description is repeated. The embodiment 5 differs from the embodiments 1 through 4 in that another apparatus is provided between the image reading apparatus 4 and either of the humidifier 550 and the charge applicator 500.

Figure 14:
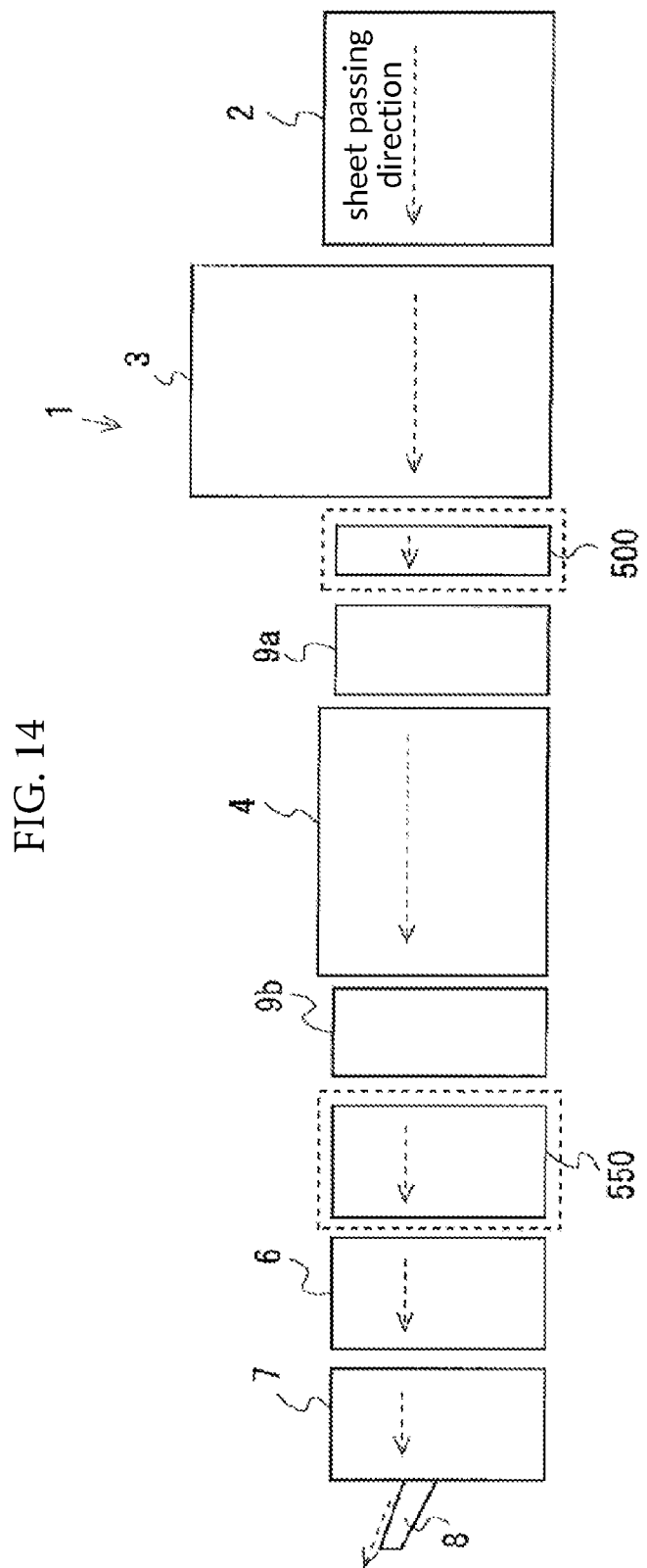
FIG. 14 is a schematic view for showing an example of the overall configuration of an image forming system 1 in accordance with an embodiment 5 of the present invention.

FIG. 14 is a schematic view for showing an example of the overall configuration of an image forming system 1 in accordance with the embodiment 5 of the present invention. As shown in FIG. 14, a finisher 9*a* is provided between the image reading apparatus 4 and the charge applicator 500, and a finisher 9*b* is provided between the image reading apparatus 4 and the humidifier 550. The finisher 9*a* is implemented, for example, with functionality as a decurler. The finisher 9*b* is implemented, for example, with functionality to perform relay conveyance.

Namely, either one of the humidifier 550 and the charge applicator 500 is arranged in the upstream side of the image reading apparatus 4 and in the downstream side of the image forming apparatus 3, and the other of the humidifier 550 and the charge applicator 500 is arranged in the downstream side of the image reading apparatus 4.

That is, in the case where the humidifier 550 is arranged in the upstream side of the image reading apparatus 4 and the charge applicator 500 is arranged in the downstream side of the image reading apparatus 4, a sheet is humidified before the sheet is conveyed to the image reading apparatus 4. Accordingly, since humidification cools a sheet, while reducing curl of a sheet and friction charge, the influence of thermochromism can be lessened when an image is read.

On the other hand, in the case where the charge applicator 500 is arranged in the upstream side of the image reading apparatus 4 and the humidifier 550 is arranged in the downstream side of the image reading apparatus 4, uneven electrification of a sheet can be made flat after the sheet is passed through the image reading apparatus 4. It is therefore possible to obtain high electricity elimination effects before post-printing processes.

Although embodiments of the present invention have been described and illustrated in detail, it is clearly understood that the same is by way of illustration and example only and not limitation, the scope of the present invention should be interpreted by terms of the appended claims.

For example, while the electricity eliminator 5 is provided as an separate unit in the case of the above embodiments, the present invention is not limited thereto. For example, the electricity eliminator 5 may be incorporated within the image reading apparatus 4 or the like.

Also, while the electricity eliminator 5, the finisher 6 and the sheet discharger 7 are separately arranged in the case of the above embodiments, the function of the electricity eliminator 5, the function of the finisher 6 and the function of the sheet discharger 7 may be implemented within a single apparatus which is located in the downstream side of the image reading apparatus 4.

Also, while the image reading signal Sout of the above embodiment is given as digital image data including R, G and B components and defined in the RGB color space, it is not limited thereto but can be defined in another color space such as the CIELAB color space.

What is claimed is:

1. An image forming system including an image forming apparatus which forms an image on a sheet, an image reading apparatus which reads the image formed on the sheet by the image forming apparatus, and a finisher which performs a post-printing process with the sheet, the image forming system comprising:
   a paper path which is provided in the image reading apparatus and through which the sheet is passed; and
   an electricity eliminator which is arranged in the upstream side of the finisher to eliminate static electricity of the sheet, wherein
   the electricity eliminator applies at least one of water and charge to front and back sides of the sheet; wherein the electricity eliminator comprises a humidifier which is freely arranged between the image forming apparatus and the finisher to apply water to the front and back sides of the sheet;
   the electricity eliminator further comprises a charge applicator which is freely arranged between the image forming apparatus and the finisher and serves to apply charge to the front and back sides of the sheet, and wherein
   the charge applicator is located in the upstream side of the humidifier.

2. The image forming system of claim 1 wherein
   either one of the humidifier and the charge applicator is arranged in an upstream side of the image reading apparatus and in a downstream side of the image forming apparatus, and wherein
   the other of the humidifier and the charge applicator is arranged in a downstream side of the image reading apparatus.

3. The image forming system of claim 1 wherein
   both the humidifier and the charge applicator are arranged in an upstream side of the image reading apparatus and in a downstream side of the image forming apparatus.

4. The image forming system of claim 1 wherein
   both the humidifier and the charge applicator are arranged in the downstream side of the image reading apparatus.

5. An image forming system including an image forming apparatus which forms an image on a sheet, an image reading apparatus which reads the image formed on the sheet by the image forming apparatus, and a finisher which performs a post-printing process with the sheet, the image forming system comprising:
   a paper path which is provided in the image reading apparatus and through which the sheet is passed; and
   an electricity eliminator which is arranged in the upstream side of the finisher to eliminate static electricity of the sheet, wherein
   the electricity eliminator applies at least one of water and charge to front and back sides of the sheet;
   wherein the image reading apparatus comprises:
     a first scanner which is arranged along the paper path to read a first image which is formed on a first surface which is either one of the front and back sides of the sheet;
     a second scanner which is arranged along the paper path in a downstream side of the first scanner to read a second image which is formed on a second surface which is the other of the front and back sides of the sheet; and
     a spectrophotometer which is arranged along the paper path in a downstream side of the second scanner to colorimetrically measure either the first image or the second image, and wherein
   the image forming apparatus corrects the color tones of the image formed on the sheet based on the reading result of the first image by the first scanner, the reading result of the second image by the second scanner and the colorimetric measurement result of either one of the first image or the second image by the spectrophotometer.

* * * * *